United States Patent
Holley et al.

(10) Patent No.: US 11,629,637 B2
(45) Date of Patent: Apr. 18, 2023

(54) SUPERCRITICAL CARBON DIOXIDE-COOLED GENERATOR AND TURBINE

(71) Applicant: Hamilton Sundstrand Corporation, Charlotte, NC (US)

(72) Inventors: Brian M. Holley, Eastford, CT (US); Ram Ranjan, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/951,205

(22) Filed: Nov. 18, 2020

(65) Prior Publication Data
US 2022/0153426 A1    May 19, 2022

(51) Int. Cl.
| F02C 1/10 | (2006.01) |
| F01K 25/10 | (2006.01) |
| F02C 7/18 | (2006.01) |
| F01K 7/32 | (2006.01) |
| F02C 7/141 | (2006.01) |

(52) U.S. Cl.
CPC .............. *F02C 1/10* (2013.01); *F01K 25/103* (2013.01); *F02C 7/185* (2013.01); *F01K 7/32* (2013.01); *F02C 7/141* (2013.01); *F05D 2260/205* (2013.01); *F05D 2260/213* (2013.01); *F05D 2260/232* (2013.01)

(58) Field of Classification Search
CPC . F02C 1/10; F01K 25/103; F01K 7/32; F05D 2260/205; F05D 2260/213; F05D 2240/61
See application file for complete search history.

(56) References Cited

U.S. PATENT DOCUMENTS

| 4,663,939 | A | * | 5/1987 | Cosby | ........................ | F02C 1/10 |
| | | | | | | 60/682 |
| 5,327,719 | A | * | 7/1994 | Mazeaud | ................... | F02C 7/18 |
| | | | | | | 60/785 |
| 5,497,615 | A | * | 3/1996 | Noe | ........................ | H02K 7/083 |
| | | | | | | 60/39.511 |

(Continued)

FOREIGN PATENT DOCUMENTS

| WO | 2015032510 A1 | 3/2015 |
| WO | 2017153387 A1 | 9/2017 |

OTHER PUBLICATIONS

European Search Report for European Application No. 21207485.0, dated Apr. 5, 2022, 9 pages.

*Primary Examiner* — Gerald L Sung
*Assistant Examiner* — Alyson Joan Harrington
(74) *Attorney, Agent, or Firm* — Cantor Colburn LLP

(57) ABSTRACT

Power generation systems are described. The systems include a shaft, a compressor operably coupled to a first end of the shaft, a turbine operably coupled to a second end of the shaft, a generator operably coupled to the shaft between the compressor and the turbine, and a working fluid arranged in a closed-loop flow path that flows through each of the compressor and the turbine to drive rotation of the shaft. The shaft includes an internal fluid conduit configured to receive a portion of the working fluid at one of the first end and the second end and convey the portion of the working fluid through the generator to the other of the first end and the second end, wherein the portion of the working fluid is rejoined with a primary flow path of the working fluid.

18 Claims, 7 Drawing Sheets

(56) References Cited

U.S. PATENT DOCUMENTS

| | | | |
|---|---|---|---|
| 5,704,218 A * | 1/1998 | Christians | B64D 13/06 |
| | | | 62/402 |
| 9,014,791 B2 | 4/2015 | Held | |
| 9,638,104 B2 | 5/2017 | Cho et al. | |
| 2004/0088995 A1* | 5/2004 | Reissig | F02C 7/185 |
| | | | 60/772 |
| 2014/0119881 A1* | 5/2014 | Kalra | F01D 11/04 |
| | | | 415/182.1 |
| 2017/0058834 A1* | 3/2017 | Vaisman | F02K 3/06 |
| 2017/0254209 A1* | 9/2017 | Smoke | F01D 5/046 |

* cited by examiner

SUPERCRITICAL CARBON DIOXIDE-COOLED GENERATOR AND TURBINE

BACKGROUND

The present disclosure generally relates to systems for power generation in vehicles, and more specifically, to turbo-generators for use m a power generation system, such as land-based, marine, and aircraft power generation systems. Embodiments of the present disclosure are directed to supercritical carbon dioxide ($sCO_2$) systems to cool generators and/or turbines of such turbo-generators.

Conventional aircraft achieve flight by using a fuel, such as jet fuel, combusted with air in a gas turbine engine to generate sufficient thrust to enable the wings to develop lift in order to keep the vehicle aloft. The gas turbine engine may also be used for generating power for onboard needs, such as, for example, hydraulic power for control surface actuation and electrical power for avionics equipment. Such gas turbine engines used to generate power for thrust, lift, and onboard power requirements typically operate in an open-loop Brayton cycle. Such an approach has typically been suitable for powering aircraft.

However, vehicles fitted with electric propulsion means are becoming more common in the aircraft industry. As a result, onboard power generation is critical to not only for electric applications but also for distributed propulsion to reduce fuel burn.

High cycle efficiency and compactness are benefits of supercritical carbon dioxide thermodynamic ($sCO_2$) cycles. Cycle efficiency tends to increase with turbine inlet temperature and pressure, which poses challenges to turbine material operating limits. Conversion efficiency from shaft power to electricity tends to decrease with generator temperature. The turbine needs to be connected by a shaft to a generator for electric generation. The proximity of the generator to a hot turbine can increase the temperature of the generator, reducing its efficiency. Furthermore, heat generated within the generator rotor itself needs to be removed. While it is desirable that the $CO_2$ driving the turbine be at high temperature and pressure, it is also desirable that the turbine material remain at lower temperature for material integrity. It is also desirable that the generator remain cool for efficient power conversion. Accordingly, improved power generation systems that employ closed-cycle systems may be advantageous.

BRIEF DESCRIPTION

According to some embodiments, power generation systems are provided. The power generation systems include a shaft, a compressor operably coupled to a first end of the shaft, a turbine operably coupled to a second end of the shaft, a generator operably coupled to the shaft between the compressor and the turbine, and a working fluid arranged in a closed-loop flow path that flows through each of the compressor and the turbine to drive rotation of the shaft. The shaft includes an internal fluid conduit configured to receive a portion of the working fluid at one of the first end and the second end and convey the portion of the working fluid through the generator to the other of the first end and the second end, wherein the portion of the working fluid is rejoined with a primary flow path of the working fluid.

In addition to one or more of the features described above, or as an alternative, further embodiments of the systems may include that the working fluid is a supercritical fluid.

In addition to one or more of the features described above, or as an alternative, further embodiments of the systems may include that the supercritical fluid is carbon dioxide.

In addition to one or more of the features described above, or as an alternative, further embodiments of the systems may include that the turbine comprises a hub and blades and the hub includes one or more hub fluid conduits fluidly connected to the internal fluid conduit of the shaft.

In addition to one or more of the features described above, or as an alternative, further embodiments of the systems may include that the portion of the working fluid flowing through the internal fluid conduit of the shaft passes through the one or more hub fluid conduits to cool the hub.

In addition to one or more of the features described above, or as an alternative, further embodiments of the systems may include that the one or more hub fluid conduits exit at a base of the blades.

In addition to one or more of the features described above, or as an alternative, further embodiments of the systems may include that the hub fluid conduits exit at a location on the blades.

In addition to one or more of the features described above, or as an alternative, further embodiments of the systems may include that the generator comprises a stator winding arranged about a generator rotor that is coupled to the shaft.

In addition to one or more of the features described above, or as an alternative, further embodiments of the systems may include that the closed-loop flow path of the working fluid passes through one or more heat exchangers.

In addition to one or more of the features described above, or as an alternative, further embodiments of the systems may include that the closed-loop flow path of the working fluid passes through at least one recuperator heat exchanger.

In addition to one or more of the features described above, or as an alternative, further embodiments of the systems may include that the closed-loop flow path of the working fluid passes through one or more precooler heat exchangers.

In addition to one or more of the features described above, or as an alternative, further embodiments of the systems may include a second compressor arranged downstream along the closed-loop flow path relative to the compressor, wherein the portion of the working fluid directed to the internal fluid conduit is extracted from a point between the compressor and the second compressor.

In addition to one or more of the features described above, or as an alternative, further embodiments of the systems may include that the portion of the working fluid directed to the internal fluid conduit is extracted from a location within the compressor.

In addition to one or more of the features described above, or as an alternative, further embodiments of the systems may include that the location is proximate a high pressure compressor stage of the compressor.

In addition to one or more of the features described above, or as an alternative, further embodiments of the systems may include that the location is proximate a low pressure compressor stage of the compressor.

In addition to one or more of the features described above, or as an alternative, further embodiments of the systems may include a coolant heat exchanger, wherein the portion of the working fluid passes through the coolant heat exchanger prior to entering the internal fluid conduit of the shaft.

In addition to one or more of the features described above, or as an alternative, further embodiments of the systems may include that the coolant heat exchanger employs at least one of ram air and a cryogenic fuel as a coolant.

According to some embodiments, aircrafts are provided. The aircrafts include a gas turbine engine and power generation system operably coupled to the gas turbine engine. The power generation system includes a shaft, a compressor operably coupled to a first end of the shaft, a turbine operably coupled to a second end of the shaft, a generator operably coupled to the shaft between the compressor and the turbine, and a working fluid arranged in a closed-loop flow path that flows through each of the compressor and the turbine to drive rotation of the shaft. The shaft includes an internal fluid conduit configured to receive a portion of the working fluid at one of the first end and the second end and convey the portion of the working fluid through the generator to the other of the first end and the second end, wherein the portion of the working fluid is rejoined with a primary flow path of the working fluid.

In addition to one or more of the features described above, or as an alternative, further embodiments of the aircrafts may include that the closed-loop flow path of the working fluid passes through one or more heat exchangers, wherein at least one of the one or more heat exchangers is thermally coupled to a portion of the gas turbine engine.

In addition to one or more of the features described above, or as an alternative, further embodiments of the aircrafts may include a second compressor arranged downstream along the closed-loop flow path relative to the compressor, wherein the portion of the working fluid directed to the internal fluid conduit is extracted from a point between the compressor and the second compressor.

In addition to one or more of the features described above, or as an alternative, further embodiments of the aircrafts may include that the portion of the working fluid directed to the internal fluid conduit is extracted from a location within the compressor.

In addition to one or more of the features described above, or as an alternative, further embodiments of the aircrafts may include that the working fluid is supercritical carbon dioxide.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1A:
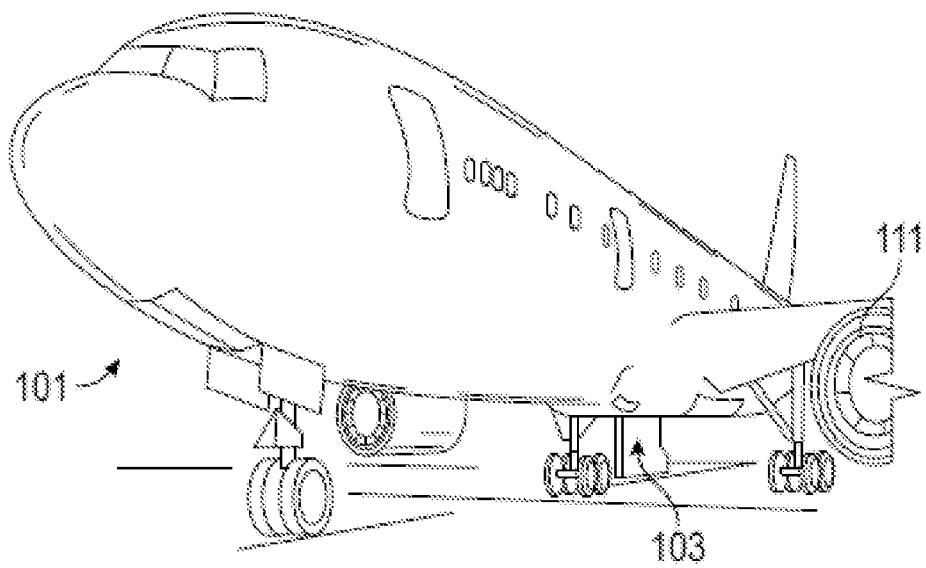
FIG. 1A is a schematic illustration of an aircraft that can incorporate various embodiments of the present disclosure.
Figure 1B:
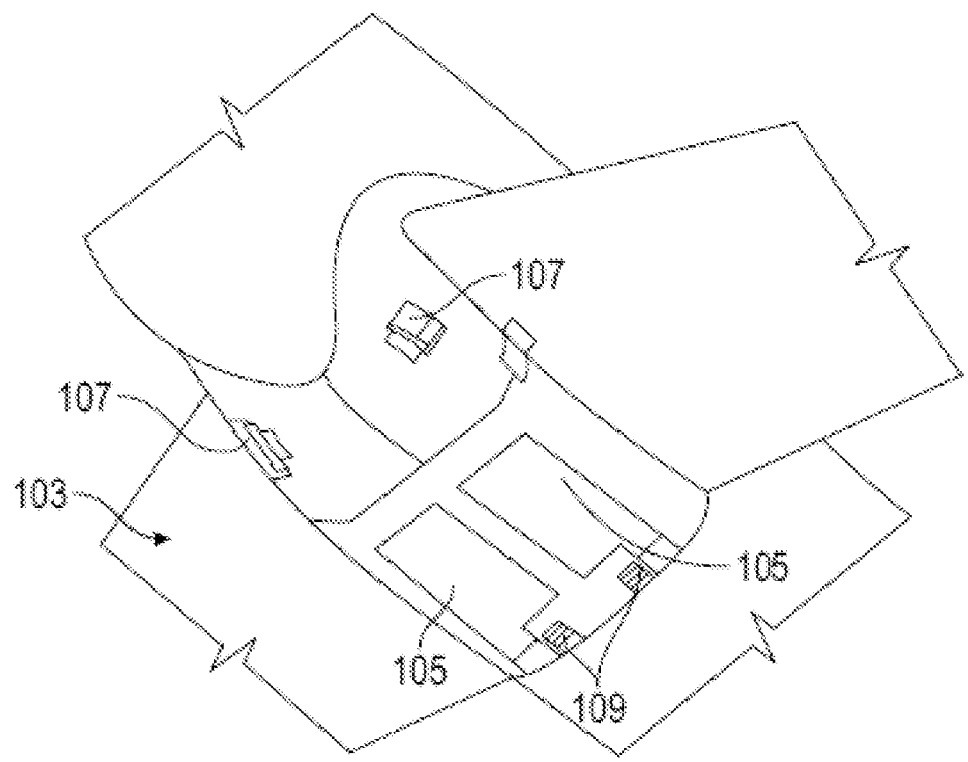
FIG. 1B is a schematic illustration of a bay section of the aircraft of FIG. 1A.

FIGS. 1A-1B are schematic illustrations of an aircraft 101 that can employ one or more embodiments of the present disclosure. As shown in FIGS. 1A-1B, the aircraft 101 includes bays 103 beneath a center wing box. The bays 103 can contain and/or support one or more components of the aircraft 101. For example, in some configurations, the aircraft 101 can include environmental control systems and/or fuel inerting systems within the bay 103. As shown in FIG. 1B, the bay 103 includes bay doors 105 that enable installation and access to one or more components (e.g., environmental control systems, fuel inerting systems, etc.). During operation of environmental control systems and/or fuel inerting systems of the aircraft 101, air that is external to the aircraft 101 can flow into one or more environmental control systems within the bay doors 105 through one or more ram air inlets 107. The air may then flow through the environmental control systems to be processed and supplied to various components or locations within the aircraft 101 (e.g., passenger cabin, fuel inerting systems, etc.). Some air may be exhausted through one or more ram air exhaust outlets 109. The ram air inlets 107 can be used to provide cooling air to various components and systems, such as onboard generators and the like.

Also shown in FIG. 1A, the aircraft 101 includes one or more engines 111. The engines 111 are typically mounted on wings of the aircraft 101 but may be located at other locations depending on the specific aircraft configuration. In some aircraft configurations, air can be bled from the engines 111 and supplied to environmental control systems and/or fuel inerting systems, as will be appreciated by those of skill in the art. The engines 111 may be configured to generate both thrust for flight and electrical power generation for operation of electronics and/or other components onboard the aircraft 101. Onboard generators may be arranged on wings, such as adjacent to the engines 111 or may be installed within the bays 105. These onboard generators may be configured to generate additional or supplemental electrical power for onboard systems of the aircraft 101.

Figure 2:
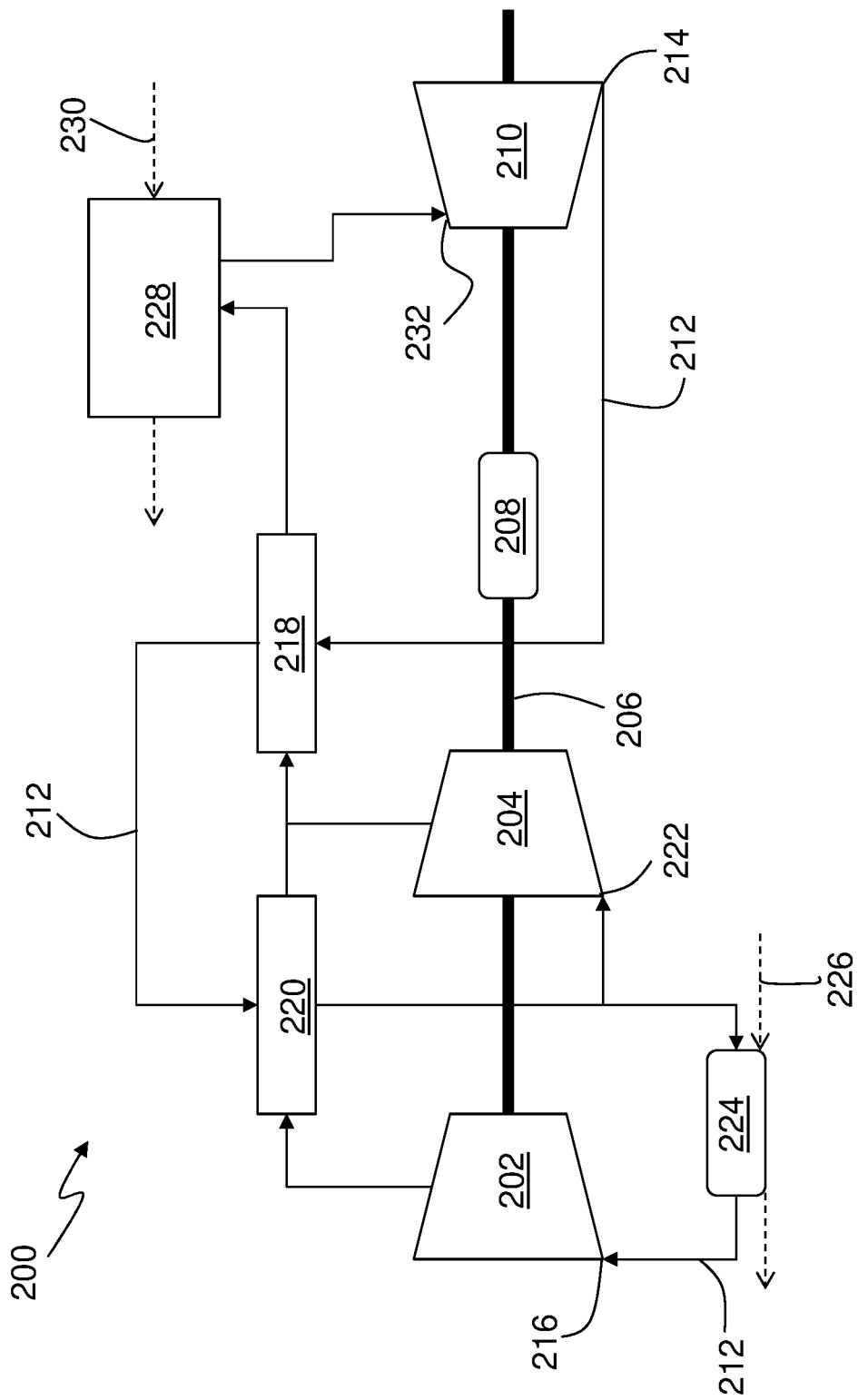
FIG. 2 is a schematic diagram of an example of a power generation system for use in an aircraft according to an embodiment.

Turning now to FIG. 2, an example of a power generation system 200 that may incorporate embodiments of the present disclosure is shown. The power generation system 200 operates as a closed-loop cycle or circuit and may be associated with a gas turbine engine of an aircraft, or with another power source of an aircraft, such as an auxiliary power unit. In some embodiments, a working fluid or first medium circulating through the closed-loop cycle of the power generation system 200 is a supercritical fluid. An example supercritical fluid is supercritical carbon dioxide ($sCO_2$). As used herein, the term "supercritical fluid" refers to a fluid in which distinct liquid and gaseous phases do not exist.

The power generation system 200 includes at least one compressor, a turbine, and a generator coaxially mounted on a common shaft. For example, in this illustrative embodiment, the power generation system 200 includes a first compressor 202 and a second compressor 204 mounted coaxially to a shaft 206. Also arranged along the shaft are a generator 208 and a turbine 210. In other embodiments of power generation systems in accordance with the present disclosure, only a single compressor, or alternatively, more than two compressors may be employed, without departing from the scope of the present disclosure. In the illustrative embodiment of FIG. 2, the second compressor 204 may be a recompressing compressor. Each of the first compressor 202 and the second compressor 204 are mechanical devices that are configured to increase a pressure of a medium. The compressors 202, 204 can be driven by another mechanical device (e.g., a motor or a medium via a turbine). Examples of types of compressors include, without limitation, centrifugal, diagonal or mixed-flow, axial-flow, reciprocating, ionic liquid piston, rotary screw, rotary vane, scroll, diaphragm, air bubble, etc., as will be appreciated by those of skill in the art.

The turbine 210 is similarly a mechanical device that expands a medium and extracts work therefrom (also referred to as extracting energy). The turbine 210 may comprise a nozzle configured to accelerate a medium supplied thereto for entry into a turbine impeller. The turbine 210 of the power generation system 200 is configured to drive the compressors 202, 204 and the generator 208, by operation (e.g., rotation) of the shaft 206. For example, as the turbine 210 is rotated, the shaft 206 is rotated. A rotor of the generator 208 (e.g., a rotor-stator generator) may be rotated by rotation of the shaft 206, enabling power generation by the generator 208. Similarly, the compressors 202, 204 may be rotated by the shaft 206 to cause compression of a fluid (e.g., a working fluid) within the closed-loop power generation system 200.

In FIG. 2, a flow path 212 of a working fluid is shown within the power generation system 200. Starting at a turbine outlet 214 of the turbine 210 and upstream from a compressor inlet 216 of the first compressor 202, along the flow path 212, is at least one heat recovery heat exchanger, also referred to herein as a recuperator. In the illustrated, non-limiting embodiment, the power generation system 200 includes a first heat recovery heat exchanger 218 and a second heat recovery heat exchanger 220. However, it will be appreciated that power generation systems having any suitable number (one or more) of recuperators are contemplated herein. The recuperators of the power generation system 200 may be two-pass heat exchangers, with the same working fluid passing through the recuperators as both a relatively hot fluid and a relatively cold fluid, depending when/where, along the flow path 212, the working fluid enters the respective recuperators.

As shown, the working fluid will flow along the flow path 212 from the turbine outlet 214 to a first pass of the first heat recovery heat exchanger 218 and then to a first pass of the second heat recovery heat exchanger 220, in series. In some embodiments, the working fluid will be cooled within each of the first heat recovery heat exchanger 218 and the second heat recovery heat exchanger 220. It is noted that the cooling is achieved by the working fluid within the second pass of each heat recovery heat exchanger (recuperator) which has been cooled as described herein.

In the illustration configuration shown in FIG. 2, the first compressor 202 and the second compressor 204 are arranged in parallel downstream from both the first heat recovery heat exchanger 218 and the second heat recovery heat exchanger 220. In this configuration, a portion of the working fluid output from the first pass of the second heat recovery heat exchanger 220 is provided to each of the inlet 216 of the first compressor 202 and an inlet 222 of the second compressor 204. That is, the working fluid is divided downstream of the heat recovery heat exchangers 218, 220 to be supplied to each of the first and second compressors 202, 204.

In some configurations, and as shown, a precooler 224 may be disposed along the flow path 212 directly upstream of the first compressor 202. Within the precooler 224, heat from a second working fluid 226 is transferred from the working fluid within the power generation system 200 to the second working fluid 226 (e.g., the precooler is a type of heat exchanger). That is, the precooler 224 can be arranged to further cool the working fluid prior to entry into the first compressor 202. In other configurations, the precooler 224 may be configured to cool the second working fluid 226, thus heating the working fluid of the power generation system 200 prior to entry into the first compressor 202. In such configurations, the output from the precooler 224 (e.g., cooled second working fluid 226) may then be used to cool one or more components of another system of an aircraft. The portion of the working fluid within the flow path 212 of the power generation system 200 is provided to the first compressor 202 where it is compressed. The output working fluid from the first compressor 202 will have a higher pressure and temperature of the working fluid at the inlet 216 of the first compressor. That is, the first compressor will increase a pressure and temperature of the working fluid as the working fluid passes through the first compressor. The portion of the working fluid that is directed to the second compressor 204 will also have the pressure and temperature increased compared to the temperature and pressures at the inlet 222 of the second compressor.

In accordance with some embodiments, the supercritical working fluid within the flow path 212 is provided to at least one of the compressors 202, 204 after the working fluid has been cooled and expanded to a temperature and pressure that is close to a critical point of the working fluid. As used herein, the term "critical point" of a supercritical fluid refers to the lowest temperature and pressure at which the substance can be said to be in a supercritical state. The terms "critical temperature" and "critical pressure" refer to the temperature and pressure at the critical point, respectively.

The output from the first compressor 202, along a branch of the flow path 212, is supplied into a second pass of the second heat recovery heat exchanger 220. Within the second heat recovery heat exchanger 220, heat is transferred from the working fluid within the first pass of the second heat recovery heat exchanger 220 to the working fluid within the second pass of the second heat recovery heat exchanger 220. The split flow path 212 is rejoined downstream of the second heat recovery heat exchanger 220, and upstream of the first heat recovery heat exchanger 218. That is, the output from the second compressor 204 is rejoined with the output from the first compressor 202. Together, the rejoined working fluid (from both compressors 202, 204) are provided through a second pass of the first heat recovery heat exchanger 218, where heat is transferred between different temperature/pressure sections of the working fluid along the flow path 212.

The working fluid will then exit the second pass of the first heat recovery heat exchanger 218 and be provided to a heater 224. In the illustrated, non-limiting embodiment, the heater 224 is a heat exchanger in which the working fluid of the power generation system 200 is arranged in a heat transfer relationship with a third working fluid 230. Heat is transferred from the third working fluid 230 to the working fluid of the power generation system 200 within the heater 228 such that the working fluid output from the heater 228 and provided to an inlet 232 of the turbine 210 has an elevated temperature and pressure. In some non-limiting embodiments, the heater 228 may be part of and/or arranged along a portion of a gas turbine engine of the aircraft, with the third working fluid being a combusted gas or the like.

The working fluid within the power generation system 200 is used in a closed-loop cycle (described above) to drive rotation of the shaft 206. The generator 208 is arranged along the shaft 206 that is driven by the turbine 210. The turbine 210 and the generator 208 may be integrated to form a turbo-generator, as will be appreciated by those of skill in the art. The turbo-generator may be used to generate electric power which can be distributed to other systems onboard an aircraft. The power generation system 200 illustrated and described herein is intended as an example only and it should be understood that power generation systems having any suitable configurations are within the scope of the present disclosure.

Figure 3:
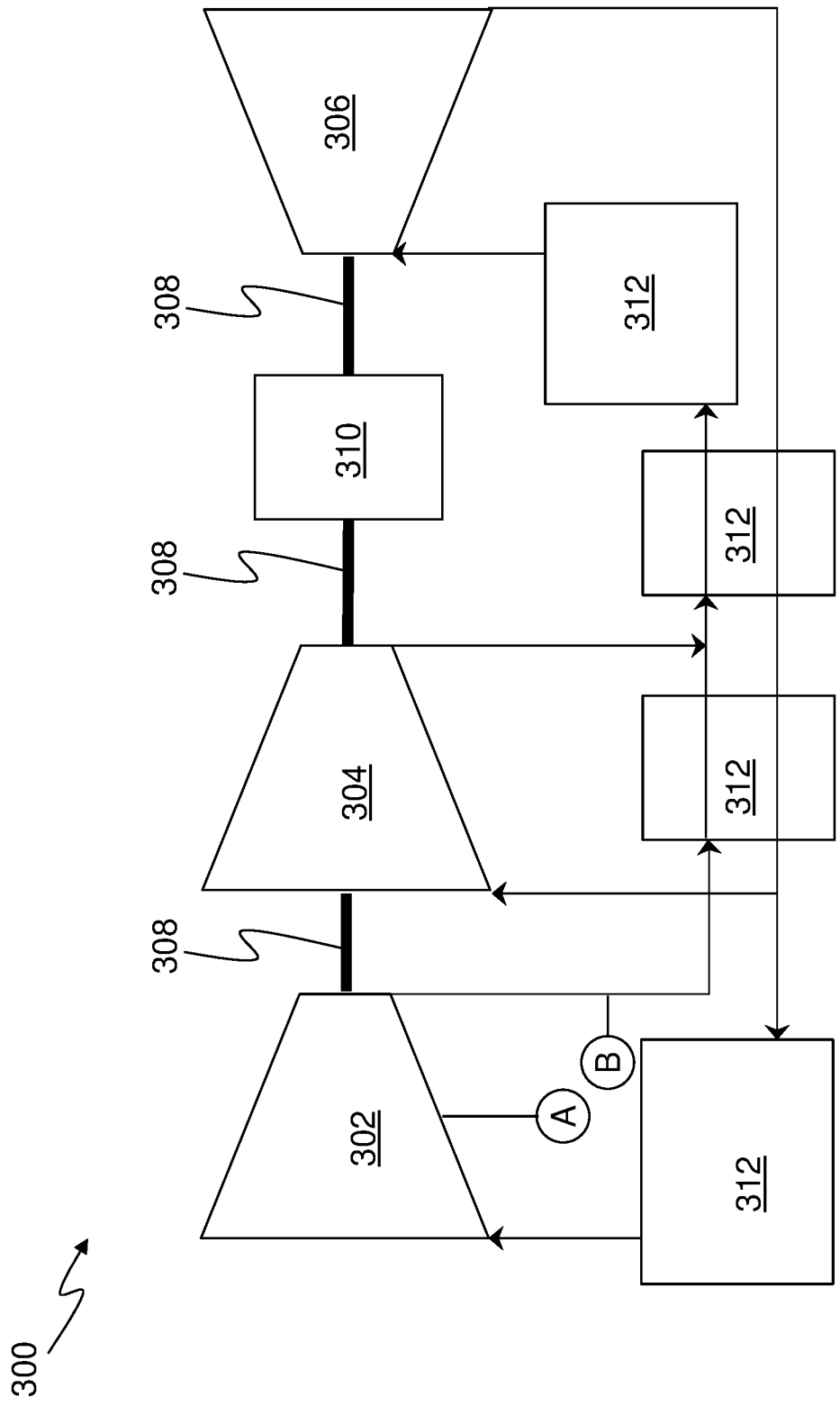
FIG. 3 is a schematic diagram of an example of a power generation system for use in an aircraft according to an embodiment.

In accordance with embodiments of the present disclosure, a portion of the working fluid may be diverted after one or more compression stages to one or more coolers for subsequent use in cooling the generator and/or turbine. FIG. 3 is a simplified cycle schematic of a power generation system 300 (e.g., a recuperated $sCO_2$ Brayton cycle with recompression). The power generation system 300 may be similar to that shown and described above. In this illustration embodiment, the power generation system 300 includes a first compressor 302, a second compressor 304, and a turbine 306 which may be arranged along a shaft 308 with a generator 310 arranged therebetween. Heat may be removed or added by passing a working fluid through one or more heat exchanges 312 (e.g., recuperators, heaters, pre-coolers, etc.).

As illustrated in FIG. 3, Point A and Point B are locations where a portion of the working fluid (e.g., $CO_2$) may be removed from the cycle for turbo generator cooling (e.g., as a coolant). The $CO_2$ coolant for the generator 310 may be diverted after a low compression stage (e.g., Point A) of the first compressor 302 if the generator is connected to a low pressure power turbine (e.g., turbine 306). In conjunction with this configuration, or independently, a diversion stream of the working fluid may be extracted from a higher compression stage of the first compressor 302 for use in cooling the turbine 306. In other embodiments or configurations, if the generator 310 is connected to a higher pressure turbine (e.g., turbine 306), the working fluid may be diverted after a high compression stage of the first compressor 302 (e.g., Point B).

The extracted working fluid, from Point A and/or Point B, or some other location along the flow path of the working, may be directed internally to the shaft 308 of the power generation system 300. The redirected portion of the working fluid may be injected into a fluid conduit that passes through the shaft 308 to provide cooling to the generator 310 and/or the turbine 306.

Figure 4:
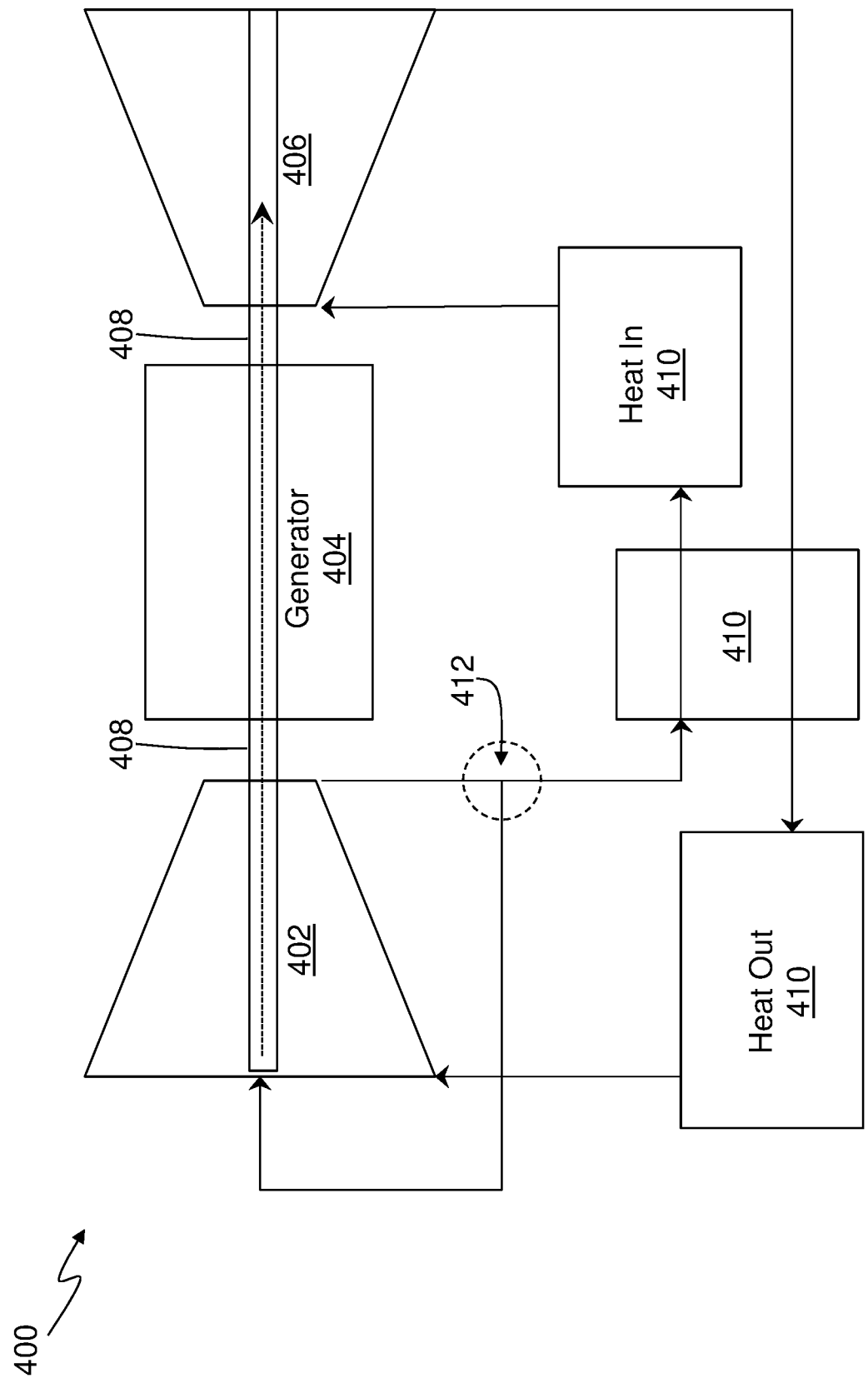
FIG. 4 is a schematic diagram of an example of a power generation system in accordance with an embodiment of the present disclosure.

For example, a cooling flow of working fluid through the turbo generator rotor is described with respect to FIG. 4. FIG. 4 is a simplified cycle schematic of a power generation system 400 (e.g., a recuperated $sCO_2$ Brayton cycle with recompression). The power generation system 400 may be similar to that shown and described above. In this illustration embodiment, the power generation system 400 includes a compressor 402, a turbine 404, and a generator 406 arranged along a shaft 408. Heat may be removed or added to a working fluid by passing the working fluid through one or more heat exchanges 410 (e.g., recuperators, heaters, pre-coolers, etc.).

In this illustrative configuration, a portion of the working fluid may be extracted from within or downstream of the compressor 402, at an extraction point 412. The extracted working fluid is supplied to the end of the shaft 408 at the compressor 402. The extracted working fluid is used as a coolant for components of the power generation system 400. The extracted working fluid passes along the shaft 408 past or through the generator 404 providing cooling thereto. In some embodiments, cooling of the generator 404 may be improved with heat conductors extending radially through the generator 404 from the shaft 404 which receives the extracted working fluid. The extracted working fluid continues toward the turbine 406. The extracted working fluid within the shaft 408 can provide thermal isolation between the turbine 406 and the generator 404. The extracted working fluid will then enter the turbine 406, cooling high stress portions which can include a bore of the turbine 406. The extracted working fluid will then return to the cycle through ports in a turbine rotor. The location of these ports may depend on the operating temperature of the turbine 406 and points of maximum stress of the turbine 406. The extracted working fluid may be used in a film cooling configuration, or in such a way to mitigate aerodynamic loss. In some embodiments, a thermal barrier coating may be used in conjunction with the extracted working fluid for increased operating temperatures of the turbine 406.

Figure 5:
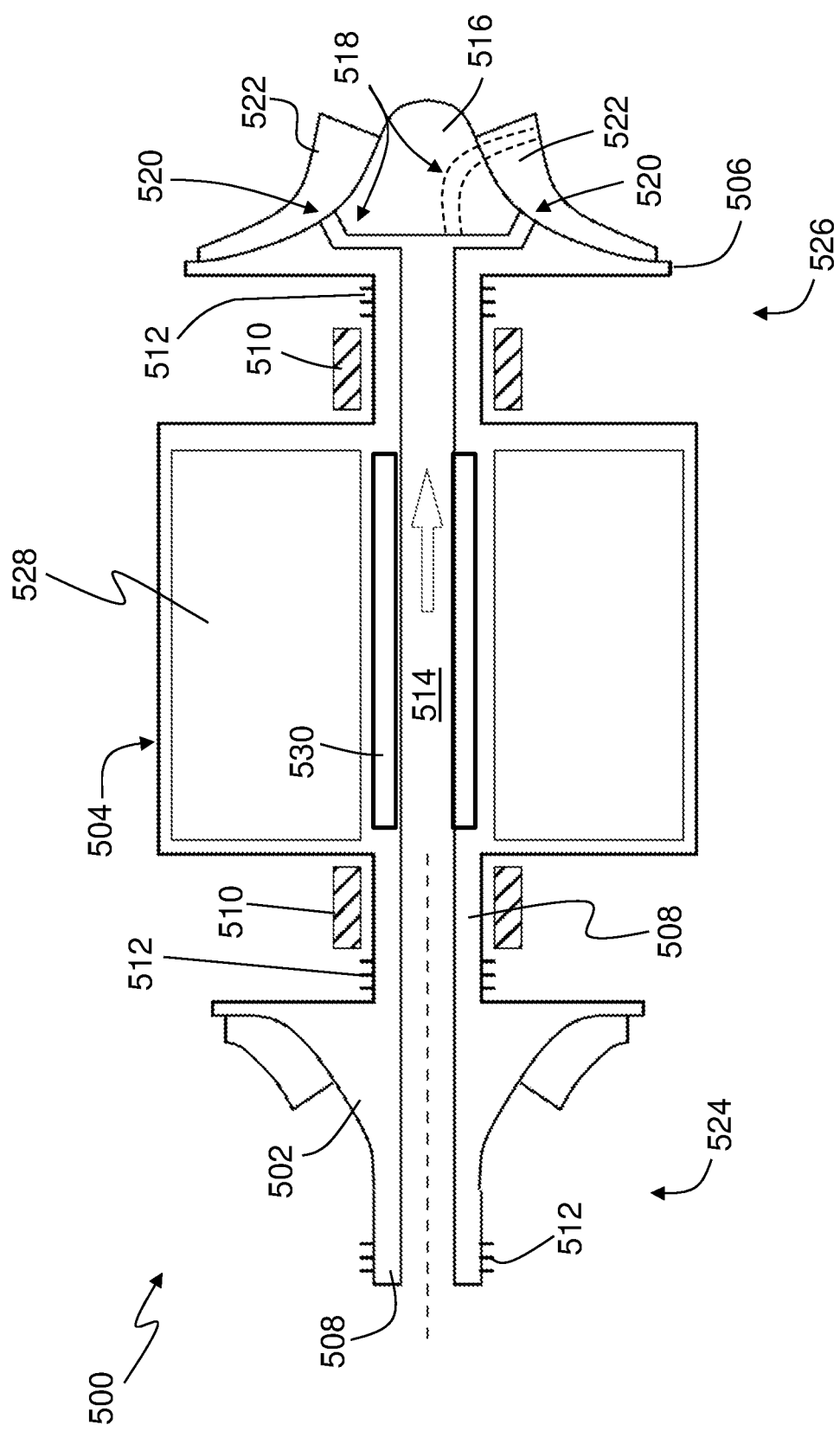
FIG. 5 is a schematic diagram of a portion of a power generation system in accordance with an embodiment of the present disclosure.

Turning now to FIG. 5, a schematic illustration of a portion of a power generation system 500 in accordance with an embodiment of the present disclosure is shown. The power generation system 500 may be a closed-loop system employing a working fluid, such as $sCO_2$, as shown and described above. As shown in FIG. 5, the power generation system 500 includes a compressor 502, a generator 504, and a turbine 506. The compressor 502, the generator 504, and the turbine 506 are operably connected by and arranged along a shaft 508. Rotation of the turbine 506 will cause rotation of the shaft 508 and thus rotation of a rotor portion of the generator 504 and rotation of the compressor 502. As shown, the shaft 508 is supported and rotatable about one or more bearings 510 with seals 512 arranged to prevent losses, ingestion, and/or leakages.

The shaft 508 is a hollow shaft defining a fluid conduit 514 passing along and within the length thereof. The fluid conduit 514 may be configured to receive a portion of a working fluid of the power generation system 500. The working fluid within the fluid conduit 514 may be obtained through an extraction of the working fluid from one or more locations along a closed-loop flow path of the working fluid within the power generation system 500. The extracted working fluid may be supplied to provide cooling to the generator 504 and the turbine 506 and also to provide a mechanism to thermally isolate and/or reduce thermal impacts from the generator 504 as applied to the turbine 506.

The extracted working fluid will flow through the fluid conduit 514 into a rotor disk or hub 516 of the turbine 506. The fluid conduit 514 will then convey the working fluid radially outward through the hub 516 through one or more hub fluid conduits 518. The hub fluid conduits 518 may have exits 520 arranged at a base of blades 522 of the turbine 506. In some configurations, the hub fluid conduits 518 may pass through the hub 506 and into the blades 522 of the turbine 506, providing cooling to the blades 522 as well. The extracted working fluid will then enter the gas path surfaces (e.g., exit the hub 516 and/or blades 522) and be rejoined with the working fluid that is operating upon the turbine 506.

In accordance with some embodiments, and as shown in FIG. 5, the compressor 502 is coupled or mounted to the shaft 508 at a first end 524 thereof. The turbine 506 is coupled or mounted to the shaft 508 at a second end 526 thereof. The generator 504 is arranged between the compressor 502 and the turbine 506 along the shaft 508. In some embodiments, the generator 504 may include a stator winding 528 arranged around a generator rotor 530. As the shaft 508 is rotated, the generator rotor 530 will be rotated inducing a current within the stator winding 528, thus generating electricity that may be directed or supplied to powered systems, such as onboard an aircraft.

Figure 6:
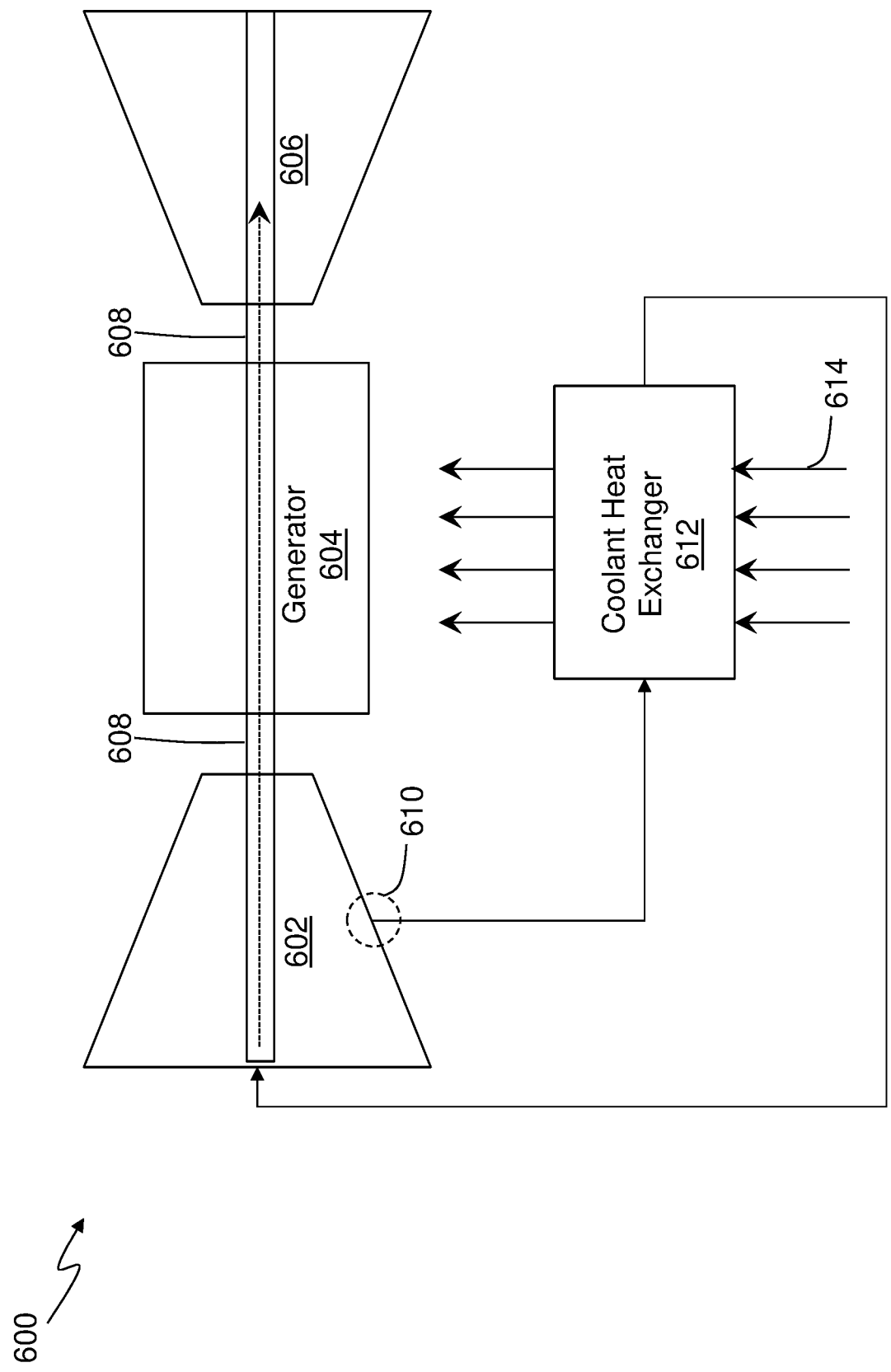
FIG. 6 is a schematic diagram of a portion of a power generation system in accordance with an embodiment of the present disclosure.

In accordance with some embodiments, additional cooling may be provided to the extracted working fluid. For example, as shown in FIG. 6, a simplified cycle schematic of a power generation system 600 (e.g., a recuperated $sCO_2$ Brayton cycle with recompression) is shown. The power generation system 600 may be similar to that shown and described above. In this illustration embodiment, the power generation system 600 includes a compressor 602, a turbine 604, and a generator 606 arranged along a shaft 608. Heat may be removed or added to a working fluid by passing the working fluid through one or more heat exchanges, as described above.

In this illustrative configuration, a portion of the working fluid may be extracted from within or downstream of the compressor 602, at an extraction point 610. The extracted working fluid is supplied to the end of the shaft 608 at the compressor 602. In this embodiment, a coolant heat exchanger 612 is arranged downstream of the extraction point 610 and upstream of the entry into the shaft 608. The extracted working fluid is used as a coolant for components of the power generation system 600. The extracted working fluid passes along the shaft 608 past or through the generator 604 providing cooling thereto. The extracted working fluid continues toward the turbine 606 along the shaft 608 and enter the turbine 606, cooling high stress portions of the turbine 606 which can include a bore of the turbine 606. The extracted working fluid will then return to the cycle through ports in a turbine rotor, as described above.

The coolant heat exchanger 612 employs a cooling fluid 614. The cooling fluid 614 may be an external fluid from the power generation system 600. For example, and without limitation, the cooling fluid 614 may be RAM air, liquid fluid (e.g., cryogenic fuel, liquid hydrogen, etc.), or other aircraft cooling loops.

Figure 7:
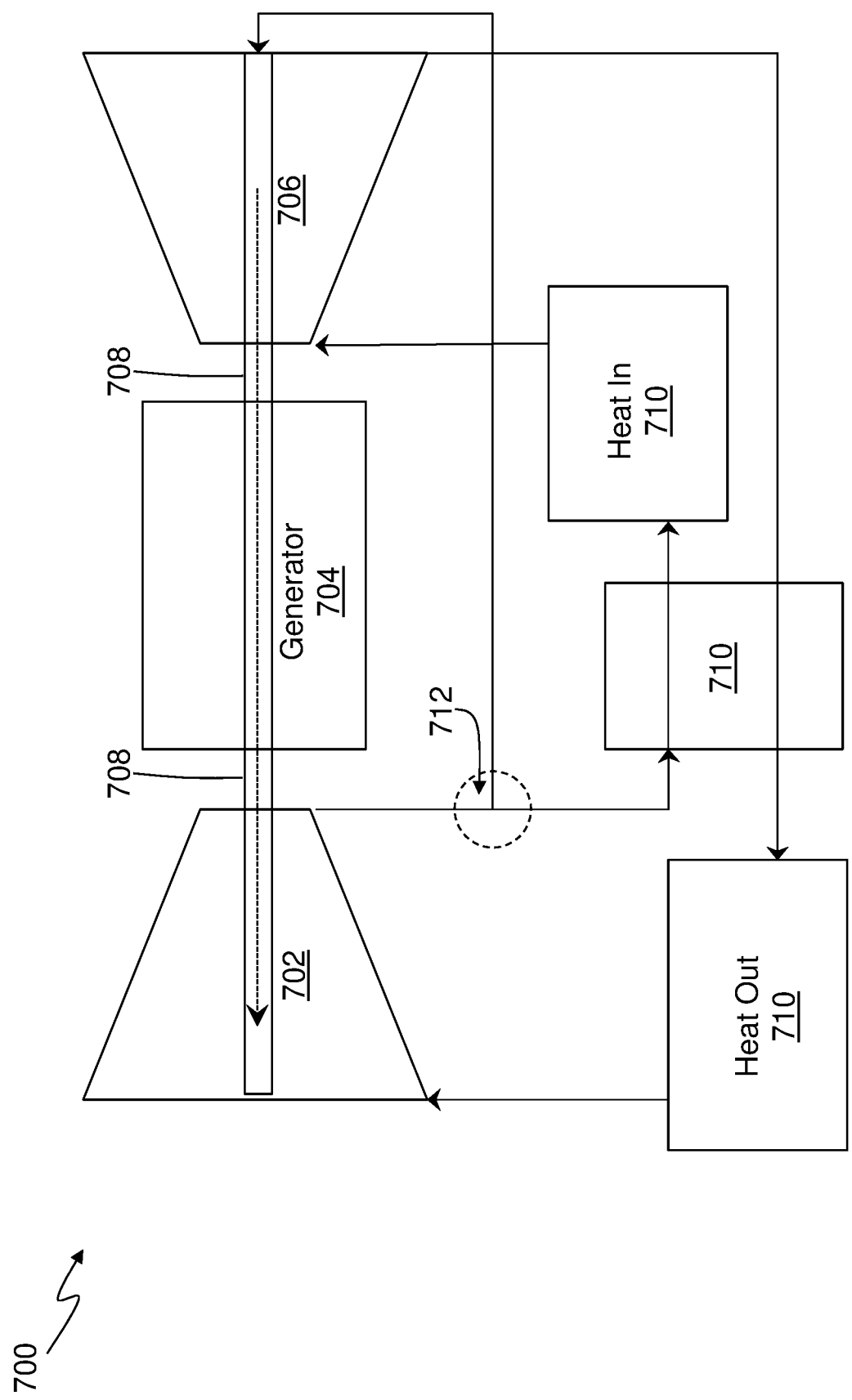
FIG. 7 is a schematic diagram of a portion of a power generation system in accordance with an embodiment of the present disclosure.

Additionally, in some embodiments, the cooling flow through the conduit of the shaft may be reversed, entering the turbine end, flowing through the generator, and then providing cooling to the compressor and reentering the main cycle flow path. FIG. 7 is a simplified cycle schematic of a power generation system 700 in accordance with an embodiment of the present disclosure. The power generation system 700 may be similar to that shown and described above. In this illustration embodiment, the power generation system 700 includes a compressor 702, a turbine 704, and a generator 706 arranged along a shaft 708. Heat may be removed or added to a working fluid by passing the working fluid through one or more heat exchanges 710 (e.g., recuperators, heaters, precoolers, etc.).

In this illustrative configuration, a portion of the working fluid may be extracted from within or downstream of the compressor 702, at an extraction point 712. In contrast to the above described embodiments, the extracted working fluid is supplied to the end of the shaft 708 at the turbine 706. The extracted working fluid is used as a coolant for components of the power generation system 700. The extracted working fluid passes along the shaft 708 past or through the generator 704 providing cooling thereto. In some embodiments, cooling of the generator 704 may be improved with heat conductors extending radially through the generator 704 from the shaft 704 which receives the extracted working fluid. The extracted working fluid continues toward the compressor 702. The extracted working fluid within the shaft 708 can provide thermal isolation between the turbine 706, the generator 704, and the compressor 702. The extracted working fluid will then enter the compressor 702, cooling high stress portions which can include a bore of the compressor 702. The extracted working fluid will then return to the cycle through ports in a compressor rotor, similar to that shown and described above with respect to the turbine configurations.

Although shown and described herein as an aircraft-based power generation system, those of skill in the art will appreciate that other applications are possible without departing from the scope of the present disclosure. For example, the power generation systems shown and described in FIGS. 2-7 may be employed in marine environments and/or may be land-based or for industrial use.

Advantageously, embodiments described herein provide for increased cycle efficiency and power density for closed-loop power generation systems. Cooling the turbine allows higher turbine inlet temperature, which is beneficial to cycle efficiency and power density. In some configurations, where the power turbine and generator operate at a relatively lower speed and pressure relative to a higher pressure stage, the result is less dense coolant and lower windage efficiency loss. In configurations where a relatively higher pressure stage is cooled, the power turbine, high pressure compressor stage, and generator can operate at relatively high pressure and speed, resulting in higher density coolant, smaller component size, and higher overall power density. For example, in accordance with some embodiments of the present disclosure, pressure can vary from 80 bar to 300 bar at the turbine inlet, and pressure at the coolant entrance to the shaft can be 10-20% higher than that of the turbine inlet, and temperature will be in range of 100-150° C. to prevent overheating of generator rotor windings or magnets.

There are also benefits to the system efficiency. For example, some leakage of the working fluid into the generator rotor cavity is typically necessary for cooling of the generator rotor. The pressure of the generator rotor cavity typically needs to be much lower than the lowest cycle pressure to manage windage losses. There is an associated parasitic loss with pumping the leaked flow back to the cycle. Cooling of the generator in the configuration of embodiments of the present disclosure can reduce the amount of leakage necessary to cool the generator, thereby reducing the parasitic pumping losses. Reduced leakage for generator cooling may also result in lower windage losses if a lower pressure can be maintained in the generator rotor cavity.

The use of the terms "a," "an," "the," and similar references in the context of description (especially in the context of the following claims) are to be construed to cover both the singular and the plural, unless otherwise indicated herein or specifically contradicted by context. The modifier "about," "substantially," and/or "approximately" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the invention has been described in detail in connection with only a limited number of embodiments, it should be readily understood that the invention is not limited to such disclosed embodiments. Rather, the invention can be modified to incorporate any number of variations, alterations, substitutions, combinations, sub-combinations, or equivalent arrangements not heretofore described, but which are commensurate with the spirit and scope of the invention. Additionally, while various embodiments of the invention have been described, it is to be understood that aspects of the invention may include only some of the described embodiments.

Accordingly, the present disclosure is not to be seen as limited by the foregoing description, but is only limited by the scope of the appended claims.

What is claimed is:

1. A power generation system, the system comprising:
   a shaft having an internal fluid conduit;
   a compressor operably coupled to a first end of the shaft and having an internal bore fluidly connected to the internal fluid conduit of the shaft;
   a turbine operably coupled to a second end of the shaft and having a hub with one or more hub fluid conduits fluidly connected to the internal fluid conduit of the shaft;
   a generator operably coupled to the shaft between the compressor and the turbine, wherein the shaft is a common shaft with the compressor, the turbine, and the generator coaxially mounted on the common shaft; and
   a working fluid arranged in a closed-loop flow path having a primary flow path that flows through each of the compressor and the turbine to drive rotation of the shaft,
   wherein a portion of the working fluid is extracted from the primary flow path and directed into the internal fluid conduit at the first end of the shaft to provide cooling to the compressor, then directed through the internal fluid conduit and the generator to provide cooling to the generator, and then into the hub and hub conduits of the turbine to provide cooling to the turbine, wherein the portion of the working fluid is rejoined with the primary flow path of the working fluid.

2. The system of claim 1, wherein the working fluid is a supercritical fluid.

3. The system of claim 2, wherein the supercritical fluid is carbon dioxide.

4. The system of claim 1, wherein the hub includes a plurality of blades extending therefrom, and the one or more hub fluid conduits exit at one or more locations proximate a base of the blades.

5. The system of claim 1, wherein the hub includes a plurality of blades extending therefrom, and the one or more hub fluid conduits exit at a location on the blades.

6. The system of claim 1, wherein the generator comprises a stator winding arranged about a generator rotor that is coupled to the shaft.

7. The system of claim 1, wherein the closed-loop flow path of the working fluid passes through one or more heat exchangers.

8. The system of claim 1, wherein the closed-loop flow path of the working fluid passes through at least one recuperator heat exchanger.

9. The system of claim 1, wherein the closed-loop flow path of the working fluid passes through one or more precooler heat exchangers.

10. The system of claim 1, further comprising a second compressor arranged downstream along the primary flow path of the working fluid relative to the compressor, wherein the portion of the working fluid directed to the internal fluid conduit is extracted from a point between the compressor and the second compressor.

11. The system of claim 1, wherein the portion of the working fluid directed to the internal fluid conduit is extracted from a location within the compressor.

12. The system of claim 11, wherein the compressor comprises a high pressure compressor stage and the location of extraction is located in the high pressure compressor stage of the compressor.

13. The system of claim 11, wherein the compressor comprises a low pressure compressor stage and the location of extraction is located in the low pressure compressor stage of the compressor.

14. The system of claim 1, further comprising a coolant heat exchanger, wherein the portion of the working fluid directed into the internal fluid conduit passes through the coolant heat exchanger prior to entering the internal fluid conduit of the shaft.

15. The system of claim 14, wherein the coolant heat exchanger employs at least one of ram air and a cryogenic fuel as a coolant.

16. An aircraft comprising:
   a gas turbine engine; and
   power generation system operably coupled to the gas turbine engine, the power generation system comprising:
   a shaft having an internal fluid conduit;
   a compressor operably coupled to a first end of the shaft and having an internal bore fluidly connected to the internal fluid conduit of the shaft;
   a turbine operably coupled to a second end of the shaft and having a hub with one or more hub fluid conduits fluidly connected to the internal fluid conduit of the shaft;
   a generator operably coupled to the shaft between the compressor and the turbine, wherein the shaft is a common shaft with the compressor, the turbine, and the generator coaxially mounted on the common shaft; and
   a working fluid arranged in a closed-loop flow path having a primary flow path that flows through each of the compressor and the turbine to drive rotation of the shaft,
   wherein a portion of the working fluid is extracted from the primary flow path and directed into the internal fluid conduit at the first end of the shaft to provide cooling to the compressor, then directed through the internal fluid conduit and the generator to provide cooling to the generator, and then into the hub and hub conduits of the turbine to provide cooling to the turbine, wherein the portion of the working fluid is rejoined with a primary flow path of the working fluid.

17. The aircraft of claim 16, wherein the closed-loop flow path of the working fluid passes through one or more heat exchangers, wherein at least one of the one or more heat exchangers is thermally coupled to a portion of the gas turbine engine.

18. The aircraft of claim 16, wherein the compressor is a first compressor and the aircraft further comprises a second compressor arranged downstream along the primary flow path of the working fluid relative to the first compressor, wherein the portion of the working fluid directed to the internal fluid conduit is extracted from a point between the first compressor and the second compressor.

\* \* \* \* \*